United States Patent
Duffield et al.

(10) Patent No.: US 8,064,359 B2
(45) Date of Patent: Nov. 22, 2011

(54) SYSTEM AND METHOD FOR SPATIALLY CONSISTENT SAMPLING OF FLOW RECORDS AT CONSTRAINED, CONTENT-DEPENDENT RATES

(75) Inventors: Nicholas Duffield, Summit, NJ (US); Lee M. Breslau, Basking Ridge, NJ (US); Cheng Ee, Rockaway, NJ (US); Alexandre Gerber, Madison, NJ (US); Carsten Lund, Berkeley Heights, NJ (US); Subhabrata Sen, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 182 days.

(21) Appl. No.: 12/343,007

(22) Filed: Dec. 23, 2008

(65) Prior Publication Data

US 2010/0157809 A1    Jun. 24, 2010

(51) Int. Cl.
*H04L 12/26* (2006.01)
(52) U.S. Cl. .......................... 370/252; 370/232; 370/241
(58) Field of Classification Search ................. 370/241, 370/250, 251, 252, 253, 229, 230, 231, 232, 370/233, 234, 351, 389, 392; 709/223, 224
See application file for complete search history.

(56) References Cited

U.S. PATENT DOCUMENTS

| | | | |
|---|---|---|---|
| 6,873,600 B1 * | 3/2005 | Duffield et al. | 370/252 |
| 7,080,136 B2 | 7/2006 | Duffield et al. | |
| 7,299,283 B1 | 11/2007 | Duffield et al. | |
| 7,536,455 B2 * | 5/2009 | Duffield et al. | 709/223 |
| 7,729,321 B2 * | 6/2010 | Liu | 370/337 |
| 2003/0007637 A1 * | 1/2003 | Banks | 380/51 |
| 2005/0213504 A1 * | 9/2005 | Enomoto et al. | 370/235 |

\* cited by examiner

*Primary Examiner* — Chi Pham
*Assistant Examiner* — Weibin Huang

(57) ABSTRACT

Disclosed herein are systems, computer-implemented methods, and computer-readable media for sampling network traffic. The method includes receiving a desired quantity of flow record to sample, receiving a plurality of network flow record each summarizing a network flow of packets, calculating a hash for each flow record of based on one or more invariant part of a respective flow, generating a quasi-random number from the calculated hash for each respective flow record, generating a priority from the calculated hash for each respective flow record, and sampling exactly the desired quantity of flow records, selecting flow records having a highest priority first. In one aspect, the method further partitions the plurality of flow records into groups based on flow origin and destination, generates an individual priority for each partitioned group, and separately samples exactly the desired quantity of flow records from each partitioned group, selecting flows having a highest individual priority first.

17 Claims, 5 Drawing Sheets

SYSTEM AND METHOD FOR SPATIALLY CONSISTENT SAMPLING OF FLOW RECORDS AT CONSTRAINED, CONTENT-DEPENDENT RATES

BACKGROUND OF THE INVENTION

1. Field of the Invention

The present invention relates to network traffic sampling and more specifically to trajectory-based and priority-based network traffic sampling.

2. Introduction

Routers summarize traffic flows in flow records which are exported to collectors, possibly through a mediation device. The mediation device has the ability to sample or otherwise select subsets of flow records in order to achieve different traffic analysis goals. Some current approaches to network traffic sampling include trajectory based (or hash based) sampling, priority-based sampling, and threshold based sampling. Trajectory based sampling observes trajectories at each router of a subset of all packets traversing the network. Priority-based sampling selects a fixed number of flow records which best represent all the flow records from a population of flow records, for example, those generated by router during a certain time interval. Threshold sampling selects a subset of flow records each being selected with a probability P that may depend on the flow record, for example being a function of the recorded size of the flow and a threshold parameter set by the user. None of these methods can consistently select subsets of flow records at different routers that a flow traverses with a selection probability that depends on the fields of the flow record while also have explicit and exact direct control over the number of flow records sampled. A user can experiment with changes to the threshold to provide some coarse, imprecise control over the number of flow records sampled and/or required bandwidth for flow sampling. When flows are selected independently with some probability, the number of flows is a random quantity and hence will not conform exactly to required bandwidth limit. Accordingly, what is needed in the art is an improved way to sample a fixed number of packets that best represents all the traffic flows in a network while retaining characteristics of trajectory-based sampling.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for sampling network traffic. The method includes receiving a desired quantity of flow record to sample, receiving a plurality of network flow record each summarizing a network flow of packets, calculating a hash for each flow record of based on one or more invariant part of a respective flow, generating a quasi-random number from the calculated hash for each respective flow record, generating a priority from the calculated hash for each respective flow record, and sampling exactly the desired quantity of flow records, selecting flow records having a highest priority first. In one aspect, the method further partitions the plurality of flow records into groups based on flow origin and destination, generates an individual priority for each partitioned group, and separately samples exactly the desired quantity of flow records from each partitioned group, selecting flows having a highest individual priority first.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
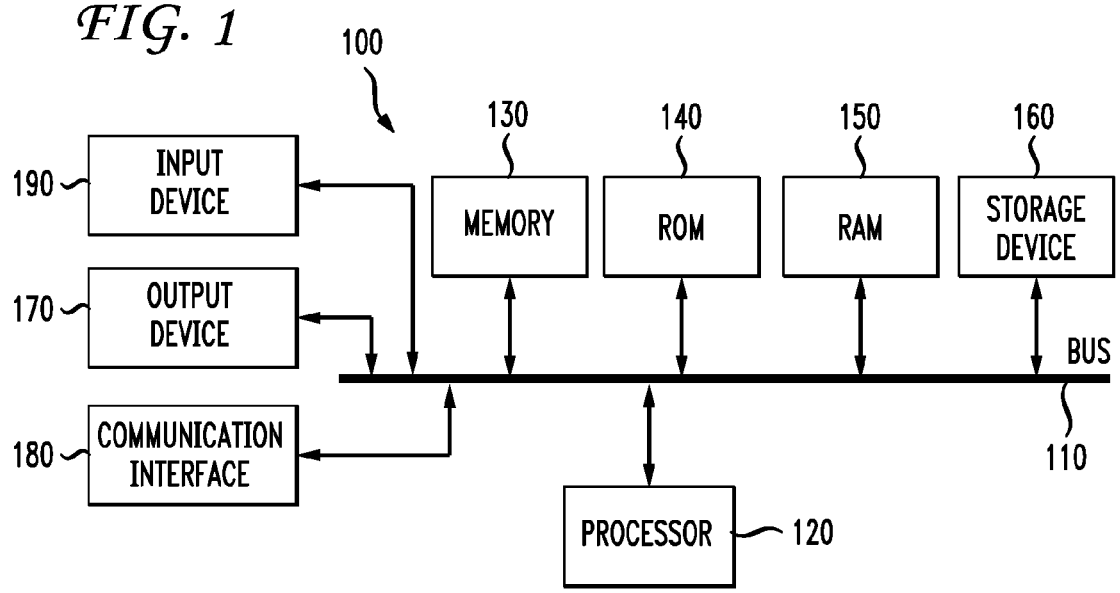
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Particular functionality may also be built into the design of a separate computer chip. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The principles described herein provide a way to coordinate traffic sampling of flow records at different locations in a data network while at the same time fulfilling user-specified objectives concerning the distribution of properties of the sampled traffic, and constraints on the rate at which flow records are sampled. A user can set different objects and constraints for different subsets of network traffic or for different network segments.

This approach can guarantee that the number of flow records doesn't exceed a certain rate and/or a certain amount of bandwidth. In one aspect, this approach collects a certain number of flow records that best represent the overall network traffic. For example, the system can sample 10,000 flows that best represent traffic in a given network over a period of one hour. Threshold sampling by itself does not allow this functionality. If the system collects too few samples, there is no mechanism to go back and collect additional data. On the other hand, if the system collects too many samples, the system has no simple way to determine which samples to drop and which to keep.

Routers summarize traffic flows in flow records which are exported to collectors. In some cases, routers export flow records to collectors through one or more mediation device. The mediation device can sample or otherwise select subsets of flow records in order to achieve different traffic analysis goals. The principles described herein can accomplish at least three goals. The first goal is limiting the sampling rate at each point within desired target limits in each of a number of disjoint traffic classes, for example partitioned by IP address, MPLS label or information derived from joining these and network state. The second goal is to consistently sample across different routers traversed by the flow. In other words, a flow that presents the same packets at each of a number of routers will be sampled at all of the routers or none of the routers. The third goal is to have sampling probabilities differently according to contents of the flow records, such as byte size The principles disclosed herein combine methods that individually fulfill the above goals. Probabilistic selection methods can constrain the number of samples taken, such as Priority Sampling. Quasi-random variates make sampling decisions by hashing content of the flow record that is invariant over observation points, thus making sampling consistent. Sampling probabilities can optimize estimation accuracy based on auxiliary flow fields, such as the number of packets or the number of bytes, through importance sampling and related approaches.

The disclosed methods relate to a single traffic class. In a measurement infrastructure a system practicing the method can instantiate multiple independent versions, each applying to a different disjoint traffic class into which traffic is mapped by filters that operate on flow key. For example, the priority sampling approach chooses k representative samples from a set of m flow records. When byte estimation accuracy is the goal, the system can select a flow record that records a byte size x determined by its so-called priority $u=x/r$, where r is a random variate uniformly distributed in the interval (0,1). When the n flow records are presented for sampling over a measurement window, the system calculates a priority for each flow record as it arrives, and maintains a reservoir of the k+1 flow records of highest priority, all others being discarded. At the end of the measurement window, the system reports the k flow records of highest priority, along with the (k+1)-th highest priority z.

In one example, a hash function h operates on the hash input w from the flow record producing a value in a set $(1, \ldots, n)$. The system can derive the hash input w from the flow key (a 5-tuple of IP protocol, source and destination IP addresses, and UDP/TCP ports). The system calculates the flow record's priority as $u=(x*n)/h(w)$. In other words, $h(w)/n$ plays the role if the random variate r. If w is invariant at different observation points, then $h(w)$ is also. Accordingly, two different routers sample the same set of flow records consistently, but also adhere to the accuracy goals for estimating byte-size as with priority sampling. If the system replaces the priority with just $n/h(w)$, in other words replaces the byte size x with 1, then the system achieves uniform sampling.

In practice, multiple flow records can have the same hash input w, such as when w is the same as the flow key. The system can correlate selections in a different manner than purely random priority sampling. This approach can lead to higher estimation variance. However the system can reduce variance by aggregating flow records with the same hash input before sampling. This step is based on an assumption of a suitable aggregation rule for the auxiliary variable x, for example adding bytes if x represents flow bytes.

A set of network traffic packets traversing a set of routers can present different flow records to the flow sampling mechanisms of different routers in the data network. Different flow records can be the result of packet loss on the network or different random outcomes of non-consistent packet sampling performed at each router prior to the compilation of flow records. For example, packet sampling can cause different routers to attribute different bytes x to flow, hence different priorities and hence different sampling decisions. This is more likely for flows where the priority $(x*n)/h(w)$ is close to the $(k+1)$^th highest priority z. Thus the system should report z and all priorities of selected flow records in order to identify the borderline flow records, for which sampling decisions may be expected to differ. Once this has been done, the system can use remaining flow records in applications that exploit consistent sampling.

One benefit of this approach is constrained global traffic matrix monitoring. If a router is able to attribute flows to an origin-destination (OD) pair based on protocol header information (IP and/or MPLS label), the router can instantiate a filter for each OD pair and sample traffic flows identified by that pair with the steps described above. Priority sampling enables the measurement system to sample at a uniform rate for each OD pair regardless of the actual traffic rate on that pair. Sampling is consistent, so the system can correlate flow records sampled at different path points or at different routers for path and performance analysis.

Another benefit of this approach is constrained tree monitoring. Constrained tree monitoring solves the problem of monitoring the paths of all traffic of a class specified by a particular key through the network. For example, this approach can monitor all traffic destined to a particular range of customer addresses. Traffic for a singly homed customer aggregates in a sink tree. Therefore, traffic rates are higher as traffic approaches the destination. The system selects the same number of samples per measurement interval at each site by filtering based on the relevant key value then performing hash-based priority sampling. In this way, the system achieves byte estimates of equal accuracy. Also, since the priority of a given flow record is the same or approximately the same (allowing for packet sampling and loss) at each sampling point, when the system selects a flow record at a given point on the tree, the system also selects the flow record at each observation point on its path further away from the destination. In this way, the system samples flow records consistently at routers in different network locations.

This approach provides yet another benefit of loss and path measurement through consistent sampling. By comparing the set of flows and flow packets sampled at different network points, the system or a user can determine the paths they followed and loss rates experienced between different observation points. Consistent sampling (either with priorities or uniform) far smaller estimation variance than independent sampling. Independent sampling variance is influenced by roughly the factor of the inverse of the sampling rate.

The described system provides a way to sample flows incorporating principles of both trajectory sampling and priority sampling. This approach can be advantageous in applications in the network where it is desirable to obtain a fixed, predictable representative sample of flows traversing the network, which routers a given flow passed through, and other network traffic characteristics. This approach combines the benefits of trajectory sampling with priority sampling to ensure that the system samples the most representative set of network flows within given parameters. While this disclosure incorporates some attributes and benefits of priority sampling and packet-level trajectory sampling (described in U.S. Pat. Nos. 7,299,283, 7,080,136, and 6,873,600), this disclosure is distinct in that it blends the two approaches.

Figure 2:
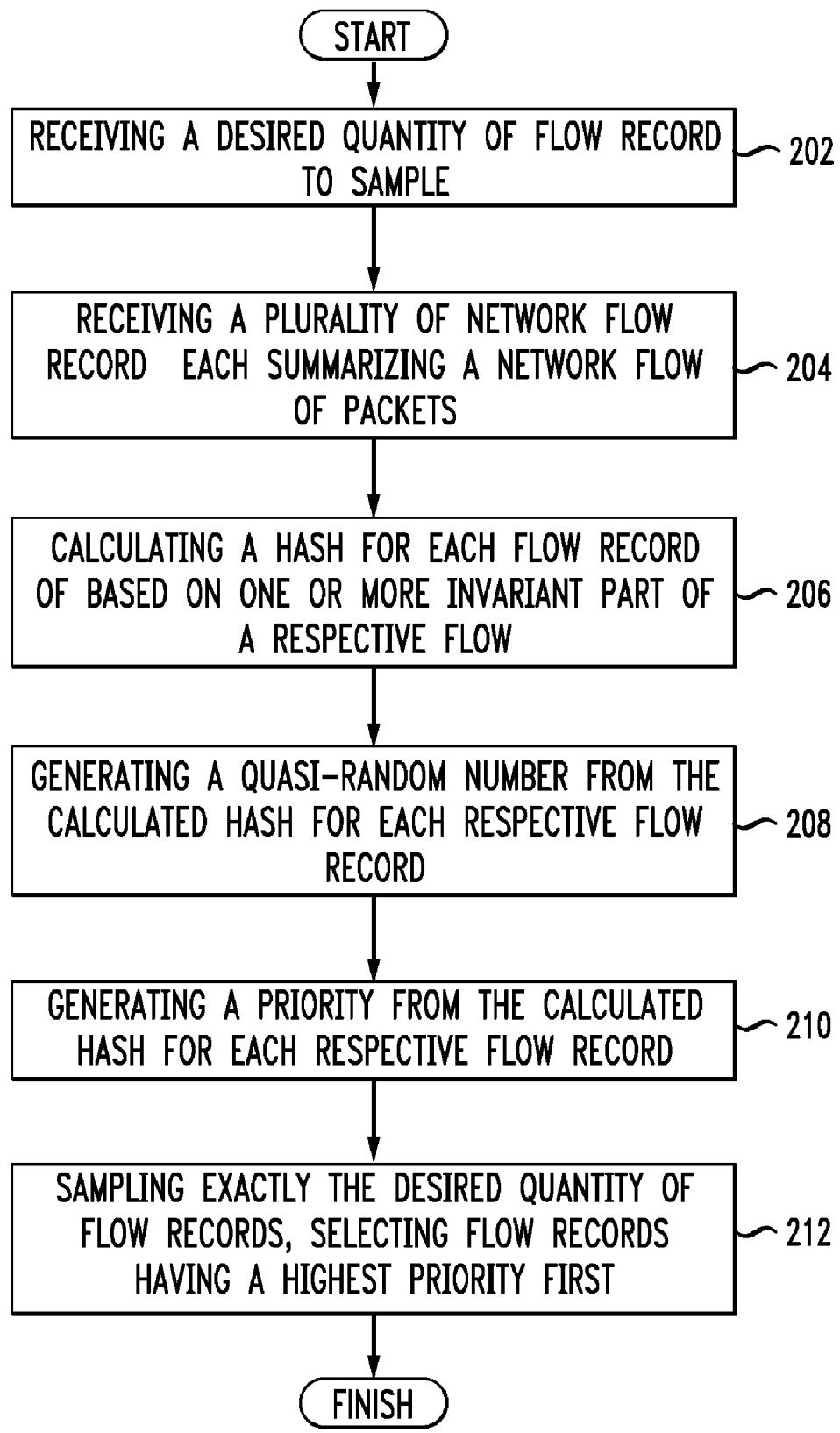
FIG. 2 illustrates an example method embodiment.

Having disclosed some fundamental system components and concepts, the disclosure turns to the example method embodiment as shown in FIG. 2. For the sake of simplicity, the example method embodiment is discussed in terms of a system configured to practice the method. The system receives a desired quantity of flows records to sample (202). For example, the quantity can be a desired number of samples, a desired bandwidth, or some other metric. Then the system receives a plurality of flow records (204). The system calculates a hash for each flow record based on one or more invariant part of a respective flow (206). Invariant parts of each flow can include one or more of destination IP address, source IP address, TCP/UDP port numbers, TCP flags, and network protocol. In a network environment where multiple routers cooperate to direct network traffic, the collection of routers can uniformly calculate hashes for flow records Uniform hash calculations allow for consistent, meaningful sampling results.

The system generates a quasi-random number from the calculated hash for each respective flow record (208). The system can divide the quasi-random number by the maximum possible hash value to obtain a number between 0 and 1 inclusive. For example, if the quasi-random number for a particular flow record is 139 and the maximum hash value is 256, the system divides 139/256=0.54296875.

The system generates a priority from the calculated hash for each respective flow record (210). The system samples exactly the desired quantity of flow records selecting flow records having a highest priority first (212). In another aspect, the priority depends on the flow size: the priority of a flow record is obtained by dividing the flow size by its quasi-random number. One embodiment of this is to assign larger flows a higher probability and smaller flows a smaller probability. After the system samples the selected flow records, the system can export sampled flow records to a central collector. The central collector can be a designated router or it can be a non-router computing or storage device. In one aspect, the system further partitions the plurality of network flows into groups based on flow origin and destination, generates an individual priority for each partitioned group, and separately samples exactly the desired quantity of flow records from each partitioned group, selecting flows records having a highest individual priority within its group first.

Figure 3:
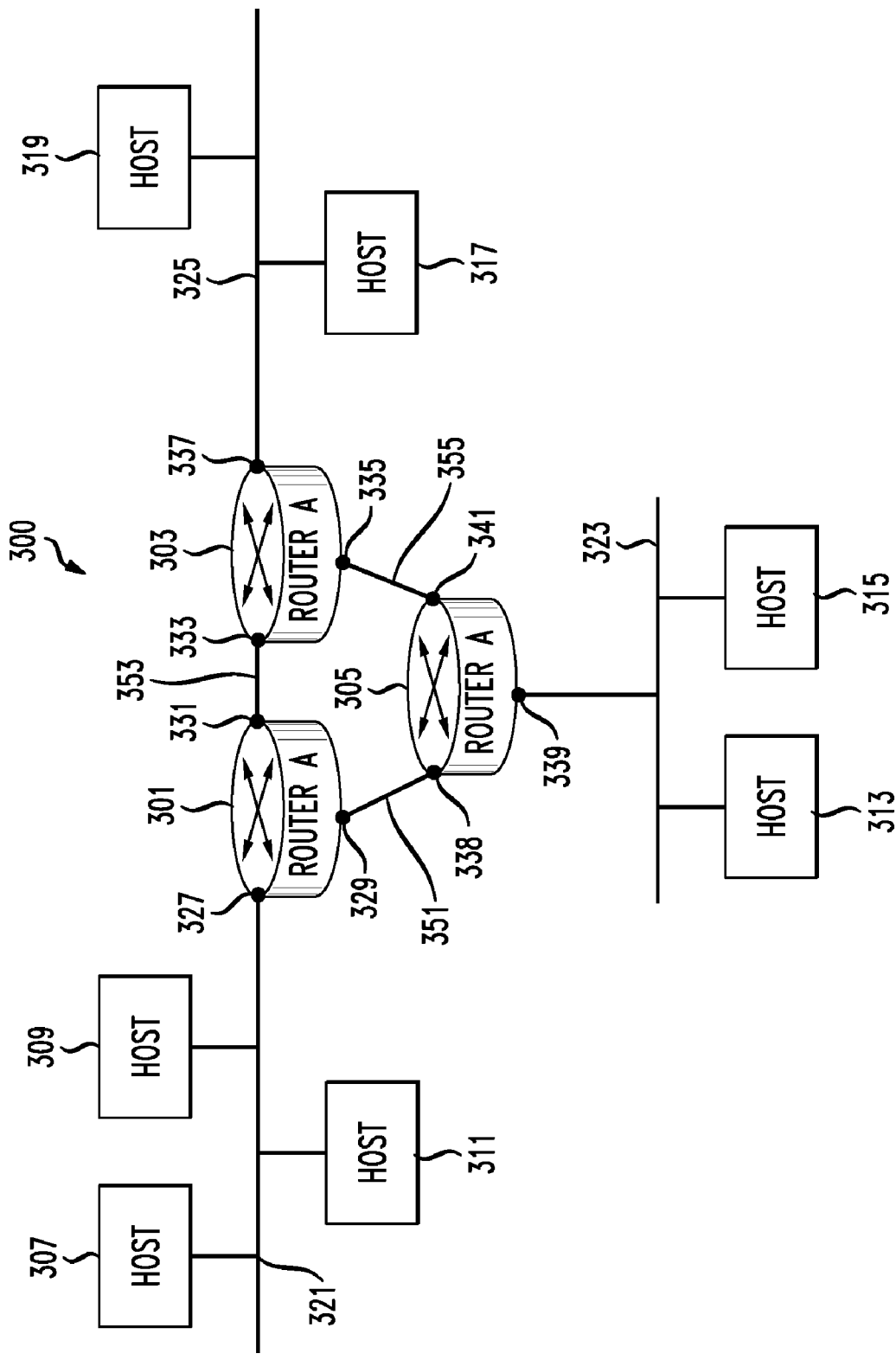
FIG. 3 illustrates an exemplary data network that utilizes spatially consistent sampling of flow records at a constrained, content-dependent sampling rate.

FIG. 3 illustrates an exemplary data network 300 that utilizes spatially consistent sampling of flow records with a content dependent sampling rate. In the exemplary embodiment of the invention, data network 300 supports Internet Protocol (IP) messaging for the users (customers) of host 307, 309, 311, 313, 315, 317, and 319. The data network 300 can also support other data/network protocols. A host can be a personal computer, workstations, mainframes, file servers, thin client, PDA, smart phone, or other computing device. Hosts 307, 309, and 311 are configured on data link 321; hosts 313 and 315 are on data link 323; and hosts 317 and 319 are configured on data link 325. In order for a host, such as host 311, to communicate to another host, such as host 319, on a different data link, the data network 300 routes IP messages through routers 301, 303, and 305 and data links 351, 353, and 355. A router forwards packets between hosts and other routers in order to enable hosts not directly connected to the same link to communicate. Each router has at least one port (e.g. 327, 329, and 331 for router 301) that connects to a data link. Similarly, ports 333, 335, and 337 correspond to router 303, and ports 338, 339, and 341 correspond to router 305. A typical data network transports many flows. Hosts can provide various services and information to one another and request services or information from one another. One host can serve as a central collector for sampling information. Each router can include a local collector for storing a limited amount of sampling information. When a router's local collector is full, at some other interval, or on request, the central collector receives sampling information from various routers in the data network 100.

Figure 4:
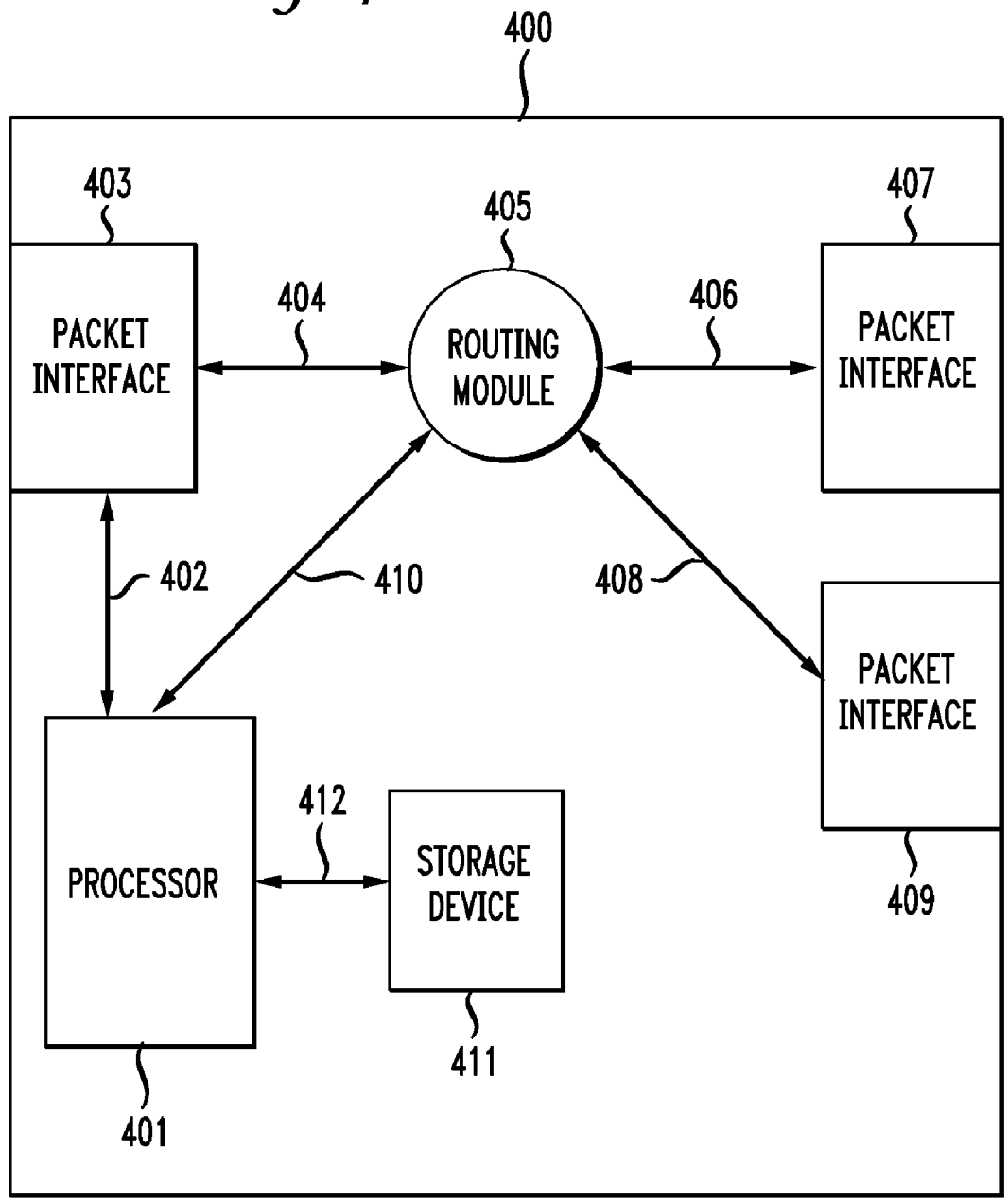
FIG. 4 illustrates a router for sampling network flows in a data network.

FIG. 4 illustrates a router 400 for sampling network flows in a data network. While a router is shown, a generic, non-routing network monitoring appliance or equivalent can replace the router. The router 400 receives and sends packets that are transported by a data network through packet interface 403. The processor 401 receives packets containing traffic information through the link 402 from the packet interface 403. The router 400 provides router functionality with routing module 405. The routing module 405 directs packets between packet interfaces 403, 407, 409 through links 404, 406, 408. The processor 401 configures the routing module 405 through the link 410 in accordance with traffic information received through the link 402. The processor 401 executes computer instructions corresponding to the steps illustrated in FIG. 2. In one aspect, the processor 401 stores network traffic information received through the link 402 to a storage device or local collector 411 through a link 412 for later retrieval or for export to a central collector, not shown.

Figure 5:
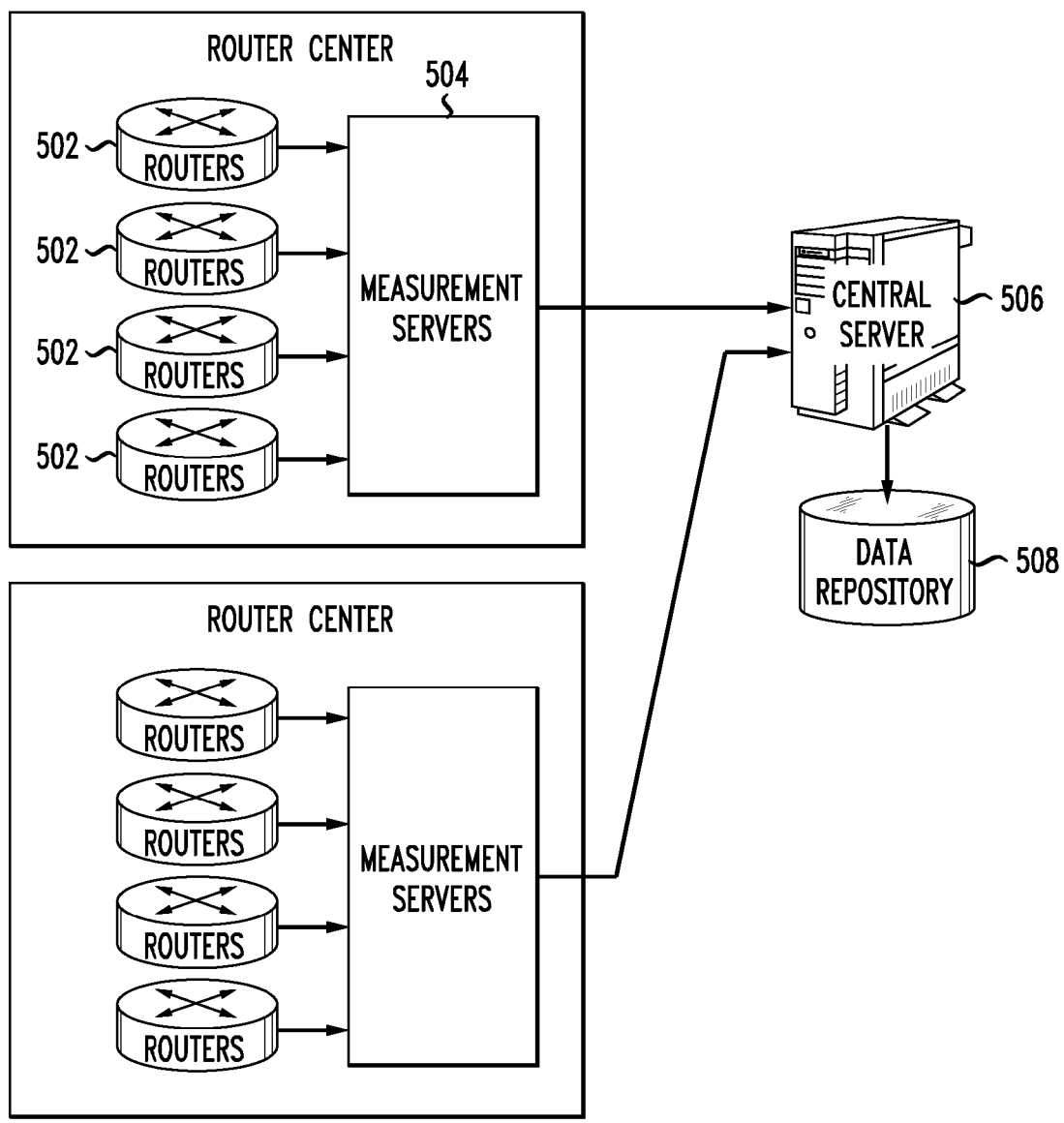
FIG. 5 illustrates a sampling framework for a data network.

FIG. 5 illustrates a sampling framework for a data network. The router center 500 stores routers 502 connecting one or more networks. The routers 502 sample network flow information from their respective networks or segments of the same network. The routers can typically store a small amount of sampled information locally. The routers export that information to a measurement server 504. The measurement server 504 can be a specialized computing device or a general purpose computer. Measurement servers 504 provide an orderly way to report sampled information to a central server 506 which stores the information in a data repository 508. The data repository can reside within the central server 506 or it can be external storage, such as a network accessible storage, external hard drive, or a USB flash drive.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein are applicable to any packet-based network which requires characteristics of both trajectory sampling and priority sampling of network flows. Those skilled in the art will readily recognize various modifications and changes that may be made to the present invention without following the example embodiments and applications illustrated and described herein, and without departing from the true spirit and scope of the present invention.

We claim:

1. A method of sampling network traffic, the method comprising:
receiving a metric representative of a desired quantity of flow records to sample to yield a received metric;
receiving a plurality of network flow records each summarizing a network flow of packets;

calculating a hash for each flow record of the plurality of flow records based on at least one invariant part of a respective flow to yield a calculated hash;

generating a quasi-random number from the calculated hash for each respective flow record;

dividing the quasi-random number by a maximum possible hash value to obtain a number between 0 and 1 inclusive;

generating a priority from the calculated hash for each respective flow record;

sampling exactly the desired quantity of flow records as indicated by the received metric; and selecting flow records having a highest priority first.

2. The method of claim 1, wherein the at least one invariant part of each flow record includes destination IP address, source IP address, TCP/UDP port numbers, TCP flags, and network protocol.

3. The method of claim 1, wherein a plurality of routers uniformly calculates hashes for flow records.

4. The method of claim 1, wherein the priority depends on a flow size.

5. The method of claim 1, the method further comprising:
partitioning the plurality of flow records into groups based on flow origin and destination;
generating an individual priority for each partitioned group; and
separately sampling exactly the desired quantity of flow records from each partitioned group, selecting flows having a highest individual priority first.

6. The method of claim 1, the method further comprising exporting sampled flow records to a central collector.

7. A system for sampling network traffic, the system comprising:
a first module configured to receive a metric representative of a desired quantity of flow records to sample to yield a received metric;
a second module configured to receive a plurality of network flow records each summarizing a network flow of packets;
a third module configured to calculate a hash for each flow record of the plurality of flow records based on at least one invariant part of a respective flow to yield a calculated hash;
a fourth module configured to generate a quasi-random number from the calculated hash for each respective flow record;
a fifth module configured to divide the quasi-random number by a maximum possible hash value to obtain a number between 0 and 1 inclusive;
a sixth module configured to generate a priority from the calculated hash for each respective flow record; and
a seventh module configured to sample exactly the desired quantity of flow records as indicated by the received metric and to select flow records a highest priority first.

8. The system of claim 7, wherein the at least one invariant part of each flow record includes destination IP address, source IP address, TCP/UDP port numbers, TCP flags, and network protocol.

9. The system of claim 7, wherein a plurality of routers uniformly calculates hashes for flow records.

10. The system of claim 7, wherein the priority depends on a flow size.

11. The system of claim 7, the system further comprising:
an eighth module configured to partition the plurality of flow records into groups based on flow origin and destination;
a ninth module configured to generate an individual priority for each partitioned group; and
a tenth module configured to separately sample exactly the desired quantity of flow records from each partitioned group, selecting flows having a highest individual priority first.

12. The system of claim 7, the system further comprising exporting sampled flow records to a central collector.

13. A non-transitory computer-readable storage medium storing computer executable instructions for sampling network traffic, the instructions comprising instructions causing a computer to:
receiving a metric representative of a desired quantity of flow records to sample to yield a received metric;
receiving a plurality of network flow records each summarizing a network flow of packets;
calculating a hash for each flow record of the plurality of flow records based on at least one invariant part of a respective flow to yield a calculated hash;
generating a quasi-random number from the calculated hash for each respective flow record;
dividing the quasi-random number by a maximum possible hash value to obtain a number between 0 and 1 inclusive;
generating a priority from the calculated hash for each respective flow record;
sampling exactly the desired quantity of flow records as indicated by the received metric; and
selecting flow records having a highest priority first.

14. The non-transitory computer-readable storage medium of claim 13, wherein the at least one invariant part of each flow includes destination IP address, source IP address, TCP/UDP port numbers, TCP flags, and network protocol.

15. The non-transitory computer-readable storage medium of claim 13, wherein a plurality of routers uniformly calculates hashes for flow records.

16. The non-transitory computer-readable storage medium of claim 13, wherein the priority depends on a flow size.

17. The non-transitory computer-readable storage medium of claim 13, the instructions further comprising:
partitioning the plurality of flow records into groups based on flow origin and destination;
generating an individual priority for each partitioned group; and
separately sampling exactly the desired quantity of flow records from each partitioned group, selecting flow records having a highest individual priority first.

* * * * *